United States Patent Office 3,423,460
Patented Jan. 21, 1969

3,423,460
PROCESS FOR EXTRACTION OF OXIMES FROM MINERAL ACID SOLUTIONS
Hans Helmut Schwarz, Krefeld-Bockum, Karl Morgenstern, Krefeld, and Joachim Schneider and Hermann Schnell, Krefeld - Urdingen, Germany, assignors to Farbenfabriken Bayer Aktiengesellschaft, Leverkusen, Germany, a German corporation
No Drawing. Filed Mar. 31, 1965, Ser. No. 444,402
Claims priority, application Germany, Apr. 4, 1964, F 42,519
U.S. Cl. 260—566                        6 Claims
Int. Cl. C07c *131/00*

ABSTRACT OF THE DISCLOSURE

Process for extracting aliphatic and cycloaliphatic oximes from aqueous mineral acid solutions. The extraction is effected by contacting the aqueous solution with an acidic organic compound such as, for example, phenol, phenol derivatives, valeric acid, oleic acid, chlorostearic acid or phenyl acetic acid.

---

This invention relates to a process for the production of aliphatic and cycloaliphatic oximes and, more particularly to a process for extraction of an oxime from its aqueous mineral acid solutions. In a number of known processes for the production of oximes, the oximes are obtained in solution in a mineral acid, such as sulphuric or phosphoric acid. For example, cycloalkanone oximes are obtained by reacting cycloaliphatic hydrocarbons with nitrosyl chloride in the presence of concentrated sulphuric acid under ultra-violet light. The oximes which form salts with the mineral acids are recovered by adding a suitable amount of a base, and separating the liberated oxime from the reaction mixture.

One great disadvantage of this process is that the mineral acid is converted into a salt from which the acid and the base cannot, as a rule, be recovered, on account of the considerable expense involved. In addition, the large, unusable quantities of salt generally represent a serious impediment to the process.

It has now been found that the aforementioned disadvantages may be obviated and that pure oximes may be obtained from aqueous mineral acid solutions by extracting the oximes from these solutions with acidic organic compounds which are liquid at the working temperature, have a dissociation constant greater than $10^{-15}$, and preferably from $10^{-3}$ to $10^{-11}$, and are chemically inert to the extraction mixture and not excessively soluble in the mineral acid phase of the extraction mixture. The resulting oxime solution may optionally be washed with water and the oxime separated.

Examples of such acidic organic compounds include aromatic hydroxy compounds, such as phenol and optionally substituted by one or more halogen atoms and/or by alkyl, cycloalkyl, aryl, nitro and alkyl or aryl ester groups or ether radicals, such as chlorophenol, dichlorophenol, cresol, chlorocresol, cyclohexylphenol, oxydiphenyl and carboxylic acids, including even unsaturated or substituted carboxylic acids, such as valeric acid, oleic acid, chlorostearic acid and phenyl acetic acid.

Oximes which may be obtained with advantage by the process according to the invention, include both open-chain and cyclic aliphatic oximes, for example the oximes of methyl isobutyl ketone, cyclohexanone and the higher cycloaliphatic ketones, for example cyclododecanone.

The extraction temperature may vary within wide limits. At normal pressure, it should not exceed the boiling point of water, but at the same time must be above the melting point of the organic compound used for extraction. In some instances, extraction may be carried out at high pressures, provided that the temperature is raised accordingly. Where organic compounds with a suitably low boiling point are used, extraction may generally be carried out to advantage at room or a slightly higher temperature, preferably in the temperature range of $+20°$ to about $50°$ C.

The extraction efficiency of the acidic organic compounds according to the invention is, to a certain extent, dependent upon the concentration of the mineral acid in the solution to be extracted, upon the nature of the oxime to be extracted and upon the extraction agent used. Although extraction may often successfully be carried out from solutions with an acid content of more than 50% by weight, it may sometimes be advisable to reduce the concentration of the mineral acid to about 50% by adding water, in order to improve extraction efficiency. For example, it would be possible under these conditions successfully to extract cyclohexanone oximes from a sulphuric acid solution with an extraction apparatus comprising only a few stages.

The mineral acids left after extraction may be reconcentrated in the usual way and may be re-used for the production of the oximes.

The oxime is recovered in the usual way, for example, by fractional distillation, from the organic phase which is formed during extraction and which, if desired, may be washed with water.

The process according to the invention may be carried out either as a batch process or as a continuous process, in which instance, the water which accumulates is used to dilute the mineral acid-oxime solution, whilst the organic solvent separated from the oxime is reused for extraction. The dilute mineral acid is concentrated by evaporation, after which the resulting concentrated mineral acid is reused in the production of the oxime whilst all or part of the condensate obtained as a result of evaporation may be used to dilute the mineral acid-oxime solution.

The following examples illustrate more particularly the invention.

EXAMPLE 1

A solution of 10 g. of cyclohexanone oxime in 65 g. of 85% by weight sulphuric acid is diluted with 45 g. of water. The oxime is extracted with $4 \times 50$ ml. of phenol at a temperature of 20° C.

The organic phases contain a total of 9.1 g. of cyclohexanone oxime, corresponding to a yield of 91% of the theoretical.

EXAMPLE 2

Cyclohexanone oxime is extracted at a temperature of 20° C. from 100 g. of a mixture of 10 g. of oxime and 100 g. of 50% by weight sulphuric acid with 100 g. of each of the solvents listed in the following table.

Cyclododecanone oxime is extracted by the same process, the sulphuric acid concentration being 60% by weight.

The extraction efficiency of each of the solvents is shown by the proportioning index $$= \frac{\text{weight of the oxime in the organic phase}}{\text{weight of the oxime in the aqueous phase}}$$

given in the following table:

| Solvent | Cyclohexanone oxime | Cyclododecanone oxime |
|---|---|---|
| Phenol | | 10 |
| O-Chlorophenol | 2,6 | 10 |
| 2,4-dichlorophenol | 1.6 | 10 |
| O-Cresol | 2.5 | 10 |
| Valeric acid | | 4.1 |

What we claim is:

1. A process for extraction of oximes of the group cyclohexanone oxime, cyclododecanone oxime and oxime of methylisobutylketone from aqueous mineral acid solutions which comprises extracting the oxime from the mineral acid solution by contacting the mineral acid solution with an acidic organic compound of the group phenol, chlorophenol, dichlorophenol, cresol, chlorocresol, cyclohexylphenol, oxydiphenyl, valeric acid, oleic acid, chlorostearic acid and phenyl acetic acid.

2. The process of claim 1, wherein the aqueous mineral acid solution of the oxime is diluted with water.

3. The process of claim 1, wherein said acidic organic compound is phenol.

4. A process according to claim 1, wherein the acidic organic compound is phenol, o-chlorophenol, 2,4-dichlorophenol, o-cresol, or valeric acid.

5. The process according to claim 4, wherein said oxime is cyclohexanone oxime.

6. The process according to claim 4, wherein said oxime is cyclododecanone oxime.

References Cited

UNITED STATES PATENTS

| | | | |
|---|---|---|---|
| 2,719,116 | 9/1955 | Brown | 260—566 XR |
| 2,822,393 | 2/1958 | Nicolaisen et al. | 260—566 |
| 2,822,394 | 2/1958 | Nicolaisen et al. | 260—566 |
| 2,248,035 | 7/1941 | Hartung et al. | 260—566 |
| 3,047,482 | 7/1962 | Cheng et al. | 260—566 |
| 3,267,143 | 8/1966 | Nenz et al. | 260—566 |
| 3,303,217 | 2/1967 | Genas et al. | 260—566 |

CHARLES B. PARKER, *Primary Examiner.*

ROBERT V. HINES, *Assistant Examiner.*

U.S. Cl. X.R.

204—162